(12) United States Patent
Jemiolo

(10) Patent No.: US 9,983,943 B2
(45) Date of Patent: May 29, 2018

(54) REVERSING OBJECT MANIPULATIONS IN ASSOCIATION WITH A WALKTHROUGH FOR AN APPLICATION OR ONLINE SERVICE

(71) Applicant: salesforce.com, inc., San Francisco, CA (US)

(72) Inventor: Daniel Everett Jemiolo, Cary, NC (US)

(73) Assignee: salesforce.com, inc., San Francisco, CA (US)

( * ) Notice: Subject to any disclaimer, the term of this patent is extended or adjusted under 35 U.S.C. 154(b) by 362 days.

(21) Appl. No.: 14/657,943

(22) Filed: Mar. 13, 2015

(65) Prior Publication Data

US 2015/0278029 A1   Oct. 1, 2015

Related U.S. Application Data

(60) Provisional application No. 61/971,148, filed on Mar. 27, 2014.

(51) Int. Cl.
*G06F 17/30* (2006.01)
*G06F 11/14* (2006.01)
*G09B 19/00* (2006.01)

(52) U.S. Cl.
CPC .... *G06F 11/1451* (2013.01); *G06F 17/30345* (2013.01); *G09B 19/0053* (2013.01)

(58) Field of Classification Search
CPC . G06F 11/323; G06F 11/3414; G06F 11/3636
USPC ................................................ 707/685, 602
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

U.S. Appl. No. 14/630,976, filed Feb. 25, 2015, Jemiolo, et al.

(Continued)

*Primary Examiner* — Jeff A Burke
*Assistant Examiner* — Thong Vu
(74) *Attorney, Agent, or Firm* — Weaver Austin Villeneuve & Sampson LLP

(57) ABSTRACT

Disclosed are examples of systems, apparatus, methods and computer program products for reversing object manipulations in association with a walkthrough for an application or online service. A first state of resources associated with the walkthrough can be recorded in a database of a database system. Input can be received to perform an interaction command with one or more demonstration objects associated with the walkthrough. The one or more demonstration objects can be caused to be manipulated in response to the input. The object manipulation can change the resources from the first state to a second state. The second state can be recorded in the database of the database system. Actions can be determined to reverse the object manipulation to return the resources to the first state. The determined actions can be caused to be performed.

13 Claims, 8 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,487,557 B1* | 11/2002 | Nagatomo | G06F 17/30876 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,536,363 B1* | 5/2009 | Rosenfeld | G09B 7/04 434/323 |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,761,406 B2* | 7/2010 | Harken | G06F 17/303 707/602 |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 7,945,856 B2* | 5/2011 | Leahy | A63F 13/358 715/706 |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,539,359 B2* | 9/2013 | Rapaport | G06Q 10/10 709/217 |
| 8,566,301 B2 | 10/2013 | Rueben et al. | |
| 8,605,133 B2* | 12/2013 | Lampotang | G06F 3/011 348/36 |
| 8,646,103 B2 | 2/2014 | Jakobson et al. | |
| 9,176,934 B2* | 11/2015 | Baschy | G06F 17/211 |
| 9,753,703 B2* | 9/2017 | Jemiolo | G06F 8/38 |
| 2001/0044791 A1 | 11/2001 | Richter | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0156774 A1* | 10/2002 | Beauregard | A61K 39/385 |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |

(56) References Cited

U.S. PATENT DOCUMENTS

| | | |
|---|---|---|
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0010368 A1* | 1/2006 | Kashi ............... G06F 17/2247 715/205 |
| 2007/0132785 A1* | 6/2007 | Ebersole, Jr. ......... A63F 13/06 345/633 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0119582 A1* | 5/2011 | Bhatt ................. G06Q 30/02 715/708 |
| 2011/0153463 A1* | 6/2011 | Lovelace ............ G06Q 10/10 705/27.1 |
| 2011/0211040 A1* | 9/2011 | Lindemann .......... G01C 11/02 348/36 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0232430 A1* | 9/2013 | Reitan ................ G06F 3/0484 715/765 |
| 2013/0247216 A1 | 9/2013 | Cinarkaya et al. |
| 2014/0047413 A1* | 2/2014 | Sheive ................ H04L 65/403 717/110 |
| 2014/0122346 A1* | 5/2014 | O'Brien ............ G06Q 30/0645 705/307 |
| 2014/0358974 A1* | 12/2014 | Romani Also .... G06F 17/30946 707/805 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0100593 A1* | 4/2015 | Underkoffler ..... G06F 17/30412 707/755 |
| 2015/0142596 A1 | 5/2015 | Jakobson et al. |
| 2015/0172563 A1 | 6/2015 | Jakobson et al. |
| 2015/0220312 A1 | 8/2015 | Jemiolo |
| 2016/0140503 A1 | 5/2016 | Jemiolo |
| 2016/0246467 A1 | 8/2016 | Jemiolo et al. |
| 2016/0246615 A1 | 8/2016 | Jemiolo et al. |

OTHER PUBLICATIONS

U.S. Appl. No. 14/630,974, filed Feb. 25, 2015, Jemiolo, et al.

U.S. Appl. No. 14/606,855, filed Jan. 27, 2015, Jemiolo, Daniel Everett.

U.S. Appl. No. 14/546,965, filed Nov. 18, 2014, Jemiolo, Daniel Everett.

"Google Plus Users", Google+Ripples, Oct. 31, 2011 [retrieved on Feb. 21, 2012 from Internet at http://www.googleplusers.com/google-ripples.html], 3 pages.

\* cited by examiner

REVERSING OBJECT MANIPULATIONS IN ASSOCIATION WITH A WALKTHROUGH FOR AN APPLICATION OR ONLINE SERVICE

PRIORITY DATA

This patent document claims priority to commonly assigned U.S. Provisional Patent Application No. 61/971,148, titled "System for Recording and Replaying Web Application Workflows", by Daniel Everett Jemiolo, filed on Mar. 27, 2014, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to walkthroughs for applications or online services. More specifically, this patent document discloses techniques for reversing object manipulations in association with a walkthrough for an application or online service.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for reversing object manipulations in association with a walkthrough for an application or online service. These drawings in no way limit any changes in form and detail that may be made by one skilled in the art without departing from the spirit and scope of the disclosed implementations.

DETAILED DESCRIPTION

Figure 1:
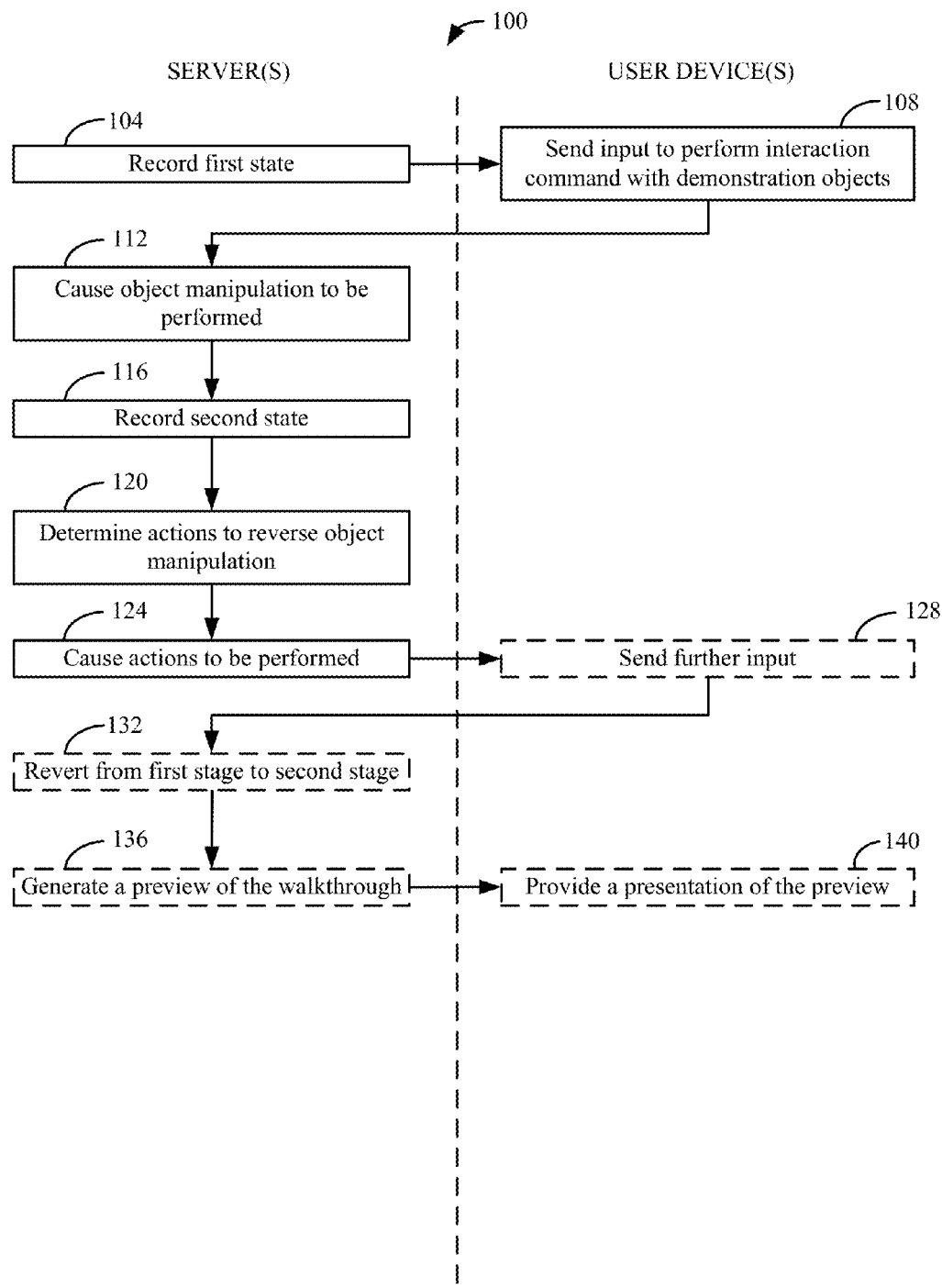
FIG. 1 shows a flowchart of an example of a method 100 for reversing object manipulations in association with a walkthrough for an application or online service, performed in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for reversing object manipulations, such as the generation, modification, or deletion of database records, in association with a walkthrough for an application or online service. The concept of walkthroughs as discussed herein encompasses a range of subject matter. A walkthrough generally refers to an interactive presentation for training a user to use any computing application or online service such as, but not limited to, a cloud-based enterprise application. In some implementations, a walkthrough can be provided using a server-based database system to deliver hands-on training to employees, customers, or other individuals at their computing devices. By way of illustration, such hands-on training can merge interactive e-learning tutorials with guided exercises within the same training application.

In a conventional walkthrough, it can be difficult to navigate back and forth between chronologically ordered segments or portions of the walkthrough. Such segments or portions are referred to herein as stages. By way of example, Tempest Freight is a small shipping business that is about to unveil a new online platform. Tempest Freight has generated a number of walkthroughs to train their employees and customers to use each of the new features of the online platform. Many of Tempest Freight's walkthroughs relate to the creation or deletion of shipping records, such as a domestic shipping record creation walkthrough, which trains users in creating domestic shipping records. Once a record has been created by a user interacting with a walkthrough, the record is stored in a database and, resultantly, the same record cannot be created again. As such, if Prospero, a software developer at Tempest Freight, creates Sample Record A in the process of completing Walkthrough Stage A of the domestic shipping record creation walkthrough, he cannot simply navigate to an earlier stage of the walkthrough and recomplete Walkthrough Stage A because Sample Record A already exists and cannot be created again.

By contrast, some of the disclosed techniques can be used to reverse an object manipulation in a walkthrough such as the creation of Sample Record A. Returning to the example from the preceding paragraph, before Prospero creates Sample Record A, an initial state of shipping records can be recorded in a database of a database system, as described further below. As Prospero completes Walkthrough Stage A, his computing device can send input over the internet to the database system. In response to Prospero's input, the database system can cause Sample Record A to be created. The creation of Sample Record A changes the state of shipping records from the initial state to a new state because Sample Record A is now recorded in a database of the database system. Accordingly, the new state of shipping records can be recorded. As discussed in detail below, actions to reverse the creation of Sample Record A and return the shipping records to the initial state can be determined, and a database system can cause such actions to be performed.

In some implementations, the disclosed techniques can be applied to allow a user to navigate backwards through a walkthrough. Returning to the example from the preceding paragraphs, once Sample Record A after the completion of Walkthrough Stage A, Prospero can navigate to an earlier stage of the walkthrough and the creation of Sample Record A can be reversed, as described above. Each time Prospero completes Walkthrough Stage A, Sample Record A can be created, and each time Prospero navigates back prior to Walkthrough Stage A, the creation of Sample Record A can be reversed.

Also or alternatively, some of the disclosed techniques can be used to more effectively take advantage of Tempest Freight's limited storage space. By way of illustration, a huge number of records, taking up a large amount of storage space, are generated by users interacting with Tempest Freight's walkthroughs because thousands of employees and customers interact with these walkthroughs each day. Since the creation of such records can be reversed as described above, an option can be provided to a user allowing her to clean up records generated in the process of interacting with a walkthrough. Also or alternatively, such a clean-up feature might be automatically triggered by the completion of a walkthrough.

Figure 2:
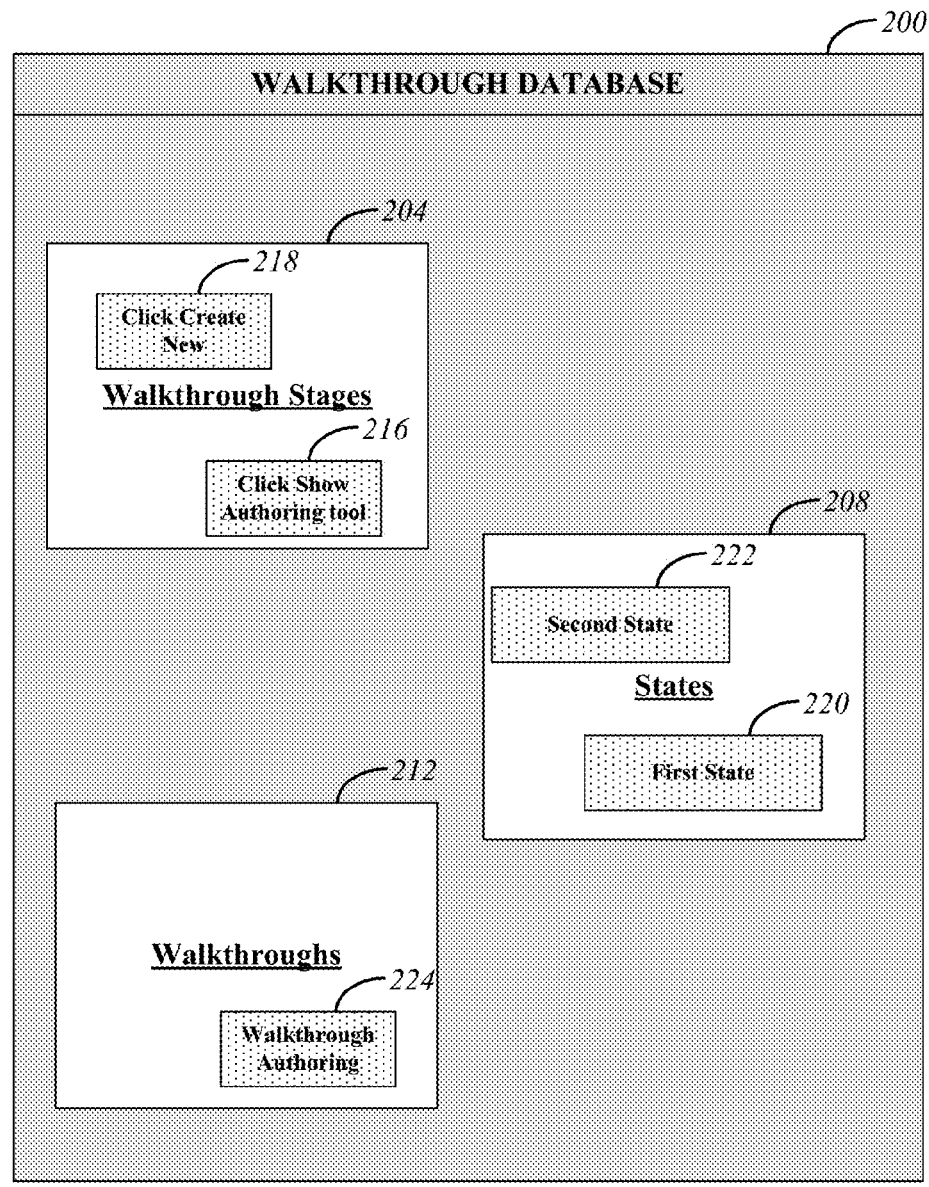
FIG. 2 shows a block diagram of an example of a Walkthrough Database 200, in accordance with some implementations.
Figure 3A:
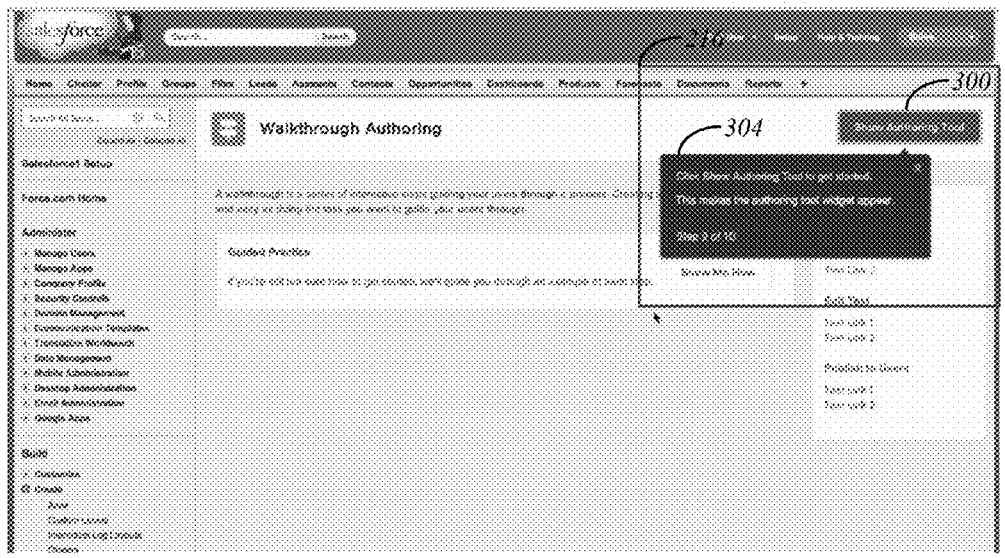
FIGS. 3A and 3B show examples of presentations of walkthrough stages in the form of graphical user interfaces (GUIs) as displayed on a computing device, in accordance with some implementations.
Figure 3B:
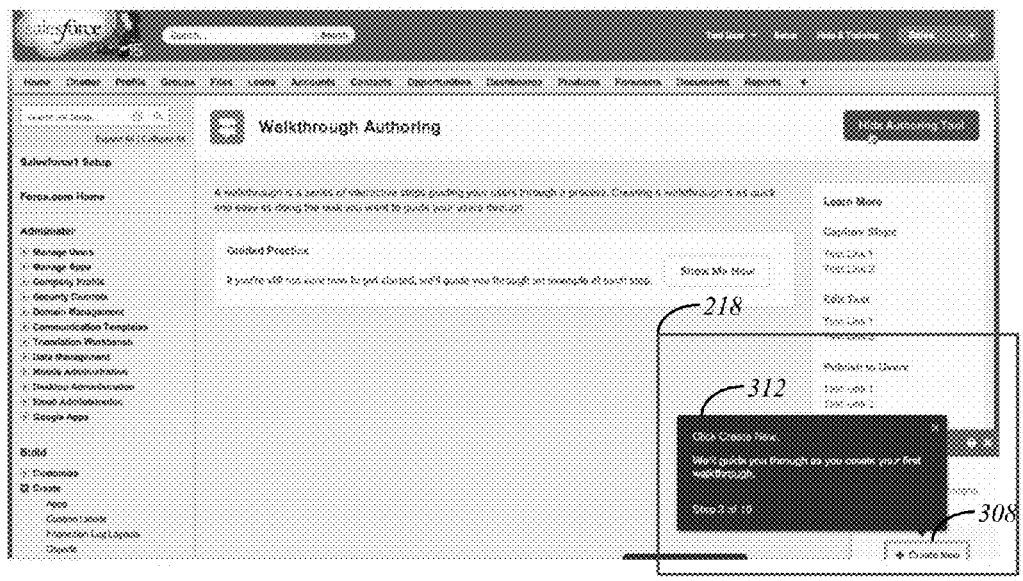
Figure 4:
FIG. 4 shows another example of a presentation of a walkthrough stage in the form of a GUI as displayed on a computing device, in accordance with some implementations.
Figure 5:
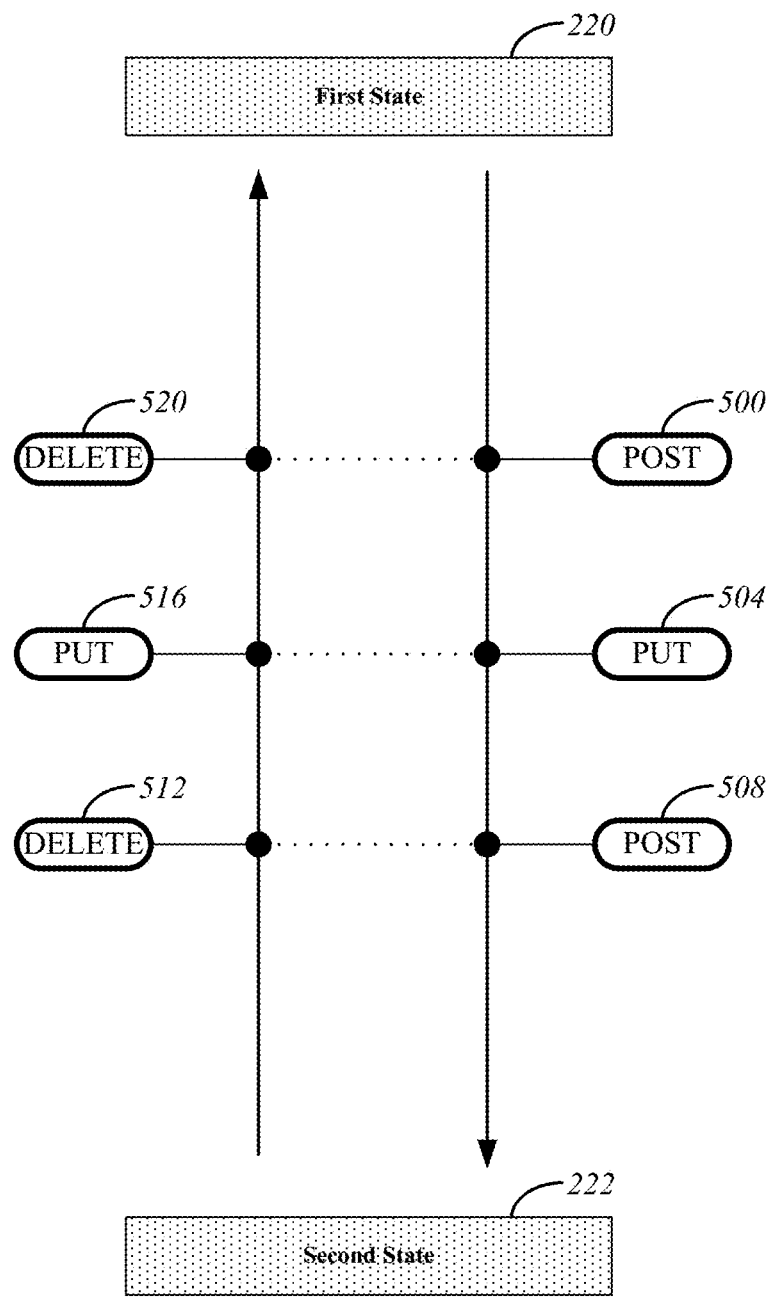
FIG. 5 shows an example of a simplified timeline of commands and reverse commands, in accordance with some implementations.

FIG. 1 shows a flowchart of an example of a method 100 for reversing object manipulations in association with a walkthrough for an application or online service, performed in accordance with some implementations. FIG. 1 is described with reference to FIGS. 2-4B. FIG. 2 shows a block diagram of an example of a Walkthrough Database 200, in accordance with some implementations. FIGS. 3A and 3B show examples of presentations of walkthrough stages in the form of graphical user interfaces (GUIs) as displayed on a computing device, in accordance with some implementations. FIG. 4 shows another example of a presentation of a walkthrough stage in the form of a GUI as displayed on a computing device, in accordance with some implementations. FIG. 5 shows an example of a simplified timeline of commands and reverse commands, in accordance with some implementations.

At 104 of FIG. 1, First State 220 of FIG. 2 is recorded in Walkthrough Database 200. First State 220 characterizes the state of resources, which can be accessed by a database system in association with a Chatter® walkthrough. The Chatter® walkthrough is a walkthrough demonstrating the use of Chatter®, an enterprise social networking system provided by Salesforce.com®. As used herein, the term state of resources refers to information indicating the status of each resource. Such resources can vary across implementations and can refer to a variety of objects or items, such as database records, files, or web content. For example, First State 220 characterizes the state of database records relating to social networking profile information, which can be accessed by a database system in association with the Chatter® walkthrough.

The way in which a state of resources is recorded can vary across implementations. For example, a Hyper Text Transfer Protocol (HTTP) verb, such as GET, can be issued to request data for each resource of the walkthrough. Such data can be stored in Walkthrough Database 200.

Walkthrough Database 200 can be maintained by servers on behalf of an organization such as Tempest Freight, by a third party such as Salesforce.com®, or both. For example, Walkthrough Database 200 can form part of a database system 16 of FIGS. 6A and 6B. In some cases, walkthrough data can be stored in tenant data storage 22, described in greater detail below. Walkthrough Database 200 can store a wide variety of customizable data objects. For example, in FIG. 2, some data objects in Walkthrough Database 200 might identify walkthrough stages 204. Walkthrough stages 204, which are segments or portions of a walkthrough, can contain both pre-defined walkthrough stages and user-defined walkthrough stages. Specific types of walkthrough stages can vary across implementations. For instance, Click Show Authoring Tool 216 is an example of a walkthrough stage that demonstrates how and when to click or tap Show Authoring Tool Button 300 of FIG. 3A as part of the Walkthrough Authoring 224 walkthrough, as described in more detail below. Click Create New 218, which demonstrates how and when to click or tap Create New Button 308 of FIG. 3B as part of the Walkthrough Authoring 224 walkthrough is another example of a walkthrough stage 204 stored in Walkthrough Database 200.

A walkthrough stage can be defined by a variety of data, such as a target, a label, start and/or completion criteria, etc., which can be stored in Walkthrough Database 200. By way of illustration, Click Show Authoring Tool 216 targets Show Authoring Tool Button 300 of FIG. 3. Additionally, Click Show Authoring Tool 216 is labeled by text box 304. Also or alternatively, a walkthrough stage can be defined by start criteria, which specify the conditions under which a walkthrough stage is displayed, and completion criteria, which specify when the stage is not displayed. By way of illustration, Click Show Authoring Tool 216 is the second walkthrough stage in the Walkthrough Authoring 224 Walkthrough; therefore, the start criterion for Click Show Authoring Tool 216 is met when the preceding stage in the Walkthrough Authoring 224 walkthrough is completed. The completion criterion for Click Show Authoring Tool 216 can be met when its target, Show Authoring Tool Button 304, is clicked or tapped by a user. Along the same lines, the walkthrough stage Click Create New 218, targets Create New Button 308 and is labeled by text box 312. Since Click Create New 218 is immediately preceded by Click Show Authoring Tool 216 in Walkthrough Authoring 224, the completion criterion for Click Show Authoring Tool 216 is the start criterion for Click Create New 218. In other words, Click Create New 218 begins when Click Show Authoring Tool 216 is completed. The completion criterion for Click Create New 218 can be met when Create New Button 308 is clicked or tapped by a user.

Returning to FIG. 2, as discussed above, some data objects in Walkthrough Database 200 can identify states 208, such as First State 220, discussed above. Such states can vary greatly across implementations and are illustrated in further detail below. For example, as described above, First State 220 characterizes a state of resources accessed by the Chatter® walkthrough.

In some implementations, some data objects in Walkthrough Database 200 might also identify walkthroughs 212 such as Walkthrough Authoring 224. Walkthrough Authoring 224 is a walkthrough demonstrating how to author walkthroughs.

Returning to FIG. 1, at 108, input, in the form of a request to create a social networking profile, is sent over a data network from a computing device and received by a server (or servers) of a database system. Such input can vary greatly across implementations and can reflect the performance an interaction command with a demonstration object (or objects) by a user interacting with a walkthrough. By way of illustration, Miranda is engaging in Walkthrough Stage 400 of FIG. 4 of the Chatter® walkthrough to learn how to use Chatter®, as described above. Walkthrough Stage 400 targets Save All Button 404 and instructs a user that her Chatter® profile will be created when she clicks Save All Button 404. As such, by clicking Save All button 404, Miranda sends input from her computing device over the internet to a database system requesting to generate a social networking profile based on text entered in fields 408. Such input can result in the generation or modification of database records in a database used by Chatter® to store Miranda's social networking profile information.

At 112, object manipulations are caused to be performed responsive to receiving the input of 108, changing the resources from First State 220 of FIG. 5 to Second State 222. Returning to the example from the preceding paragraph, a database system can process Miranda's input to generate a Chatter® profile. For instance, an action such as the issuance of an HTTP verb (or verbs) can be performed. By way of example, the HTTP verb POST 500 of FIG. 5 can be issued to generate Miranda's user profile as well as other database records such as a role set, a permission set, a preference set, etc. Along these lines, the HTTP verb PUT 504 can be issued to add Miranda to an existing Chatter® group (or groups), and the HTTP verb POST 508 can be issued to generate a social networking message, welcoming Miranda to Chatter®.

The changing of resources from one state to another state can vary across implementations. For instance, as described in examples above, changing resources from First State 220 to Second State 222 can include generating, modifying, or supplementing a record (or records) relating to a profile of an online social networking system stored in a database of a database system.

Also or alternatively, changing resources from one state to another state can include generating, modifying, or supplementing a CRM (Customer Relationship Management) record stored in a database of a database system. Such a CRM record might identify a variety of data such as an account, a task, a lead, a contact, a contract, or an opportunity. By way of example, an accounts walkthrough might train users in generating account records in a platform provided by Salesforce.com®. While a user interacts with the accounts walkthrough, a number of account records can be created. Each time an account record is created the state of resources accessed by the accounts walkthrough can be changed and can be recorded in a database, as described above.

Returning to FIG. 1, at 116, Second State 222 is recorded in Walkthrough Database 200 of FIG. 2. As discussed above, the way in which a state of resources is recorded can vary across implementations. For example, an HTTP verb, such as GET, can be used to request data for each resource of the Chatter® walkthrough, such as the database records of Miranda's profile, her role set, permission set, preference set, group membership, social networking posts, etc. Such data can then be stored in Walkthrough Database 200.

At 120, actions to reverse the object manipulations of 112 are determined. The way in which such actions are determined can vary across implementations. For instance, such actions can be determined based on First State 220 of FIG. 5 and Second State 222, as illustrated below. In some implementations, determining the action (or actions) to reverse an object manipulation can be accomplished by applying a set of rules such as a mapping of designated commands to designated reverse commands. Returning to the example of HTTP verbs discussed above, a designated reverse command for POST can be DELETE. A designated reverse command for DELETE can be POST using content from an earlier state, which has been recorded using GET, as described above. A designated reverse command for PUT can be PUT using content from an earlier state, which has been recorded using GET, as described above.

In some implementations, such a mapping of commands to reverse commands can be used to determine the action (or actions) to reverse the object manipulation. By way of illustration, since POST 500, PUT 504, and POST 508 of FIG. 5 were issued to change the resources of Chatter® walkthrough from First State 220 to Second State 222, the reverse commands DELETE 512, PUT 516 and DELETE 520 can be determined based on the mapping described in the preceding paragraph. In other words, DELETE 512 can be issued to delete the welcome message generated by POST 508. Similarly, PUT 516 can be issued remove Miranda from the Chatter® groups to which she was added using PUT 504. Lastly, DELETE 520 can be issued to delete the user profile and other records generated by POST 500. As such, the issuance of DELETE 512, PUT 516 and DELETE 520 can return the resources of the Chatter® walkthrough from Second State 222 to First State 220.

Returning to FIG. 1, at 124, the determined actions are caused to be performed. In other words, DELETE 512, PUT 516 and DELETE 520 of FIG. 5 can be issued to return the resources of the Chatter® walkthrough from Second State 222 of FIG. 5 to First State 220.

In some but not all implementations, at 128, further input from a user requesting to navigate from a later stage of a walkthrough to an earlier stage of the walkthrough is sent from a computing device and is received by the database system. By way of example, Miranda might want to move back and forth between Stage 400 of FIG. 4 and Stage Z, which immediately follows Stage 400. She might do so in order to ensure that she fully understands both stages. Miranda can accomplish this by clicking or tapping a back button which can be provided in a presentation in a user interface on Miranda's computing device in association with the Chatter® walkthrough. Each time Miranda completes Stage 400 and navigates to Stage Z the object manipulations described above can be performed, and each time she navigates back to Stage 400, such object manipulations can be reversed, as described above.

In some but not all implementations, at 132, the later stage is reverted to the earlier stage. Returning to the example of the preceding paragraph, Miranda is returned to Stage 400 after clicking or tapping the back button while interacting with Stage Z.

Some of the disclosed techniques can be used to move back and forth between walkthrough stages while editing a walkthrough, as part of an interactive editable preview. For example, in some but not all implementations, at 136, a preview of a walkthrough is generated and at 140 a presentation of the preview is provided. The preview can to be accessed via a data network such as the internet and interacted with by a user. By way of example, Prospero might click or tap a button in the user interface of his iPad® requesting to view the preview. A database system can provide data to Prospero's iPad® which can be processed by a processor of the iPad® to display a presentation of the preview. Prospero can then interact with the preview to move backwards and forwards through walkthrough stages, as described further below.

In some implementations, a user might view a presentation of a preview and decide to modify a walkthrough. By way of illustration, if Prospero views a preview and notices that some text in the preview is inaccurate, he can request to modify the walkthrough by editing the inaccurate text. The walkthrough can then be modified according to Prospero's request and the modified walkthrough can be stored in Walkthrough Database 200. Prospero can check his work by navigating backwards and forwards between the edited walkthrough stages using the techniques described above.

Some of the disclosed techniques can be used to clean up after a walkthrough. For example, using the techniques described above, actions to return resources to an initial state prior to the initiation of a walkthrough can be determined. By way of illustration, Miranda can click or tap a "clean up walkthrough" button while she is interacting with the Chatter® walkthrough. The techniques described above can be used to return the resources of the Chatter® walkthrough to the state they were in before Miranda initiated the Chatter® walkthrough.

Also or alternatively, some of the disclosed techniques can be used to generate or supplement a walkthrough log. For instance, each time a state of resources changes, such a log can be generated or modified. By way of example, a walkthrough log keeping track of Miranda's progress in the Chatter® walkthrough can be generated when she initiates the walkthrough. Each time Miranda completes a walkthrough stage or navigates backwards through a walkthrough stage, the walkthrough log can be updated.

In some implementations, a walkthrough log can be used for troubleshooting purposes. Returning to the example of the preceding paragraph, if Miranda runs into a bug and her computing device freezes in the midst of completing the Chatter® walkthrough, Prospero, can review the walkthrough log of Miranda's Chatter® walkthrough to determine when, and potentially why, and/or how Miranda's computer computing device froze. As such, Prospero can use this information to fix bugs in the Chatter® walkthrough.

Also or alternatively, a walkthrough log can be used for auditing. By way of example, Miranda can review the walkthrough logs of her employees to ensure that each employee is fully and properly completing walkthroughs.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 6A:
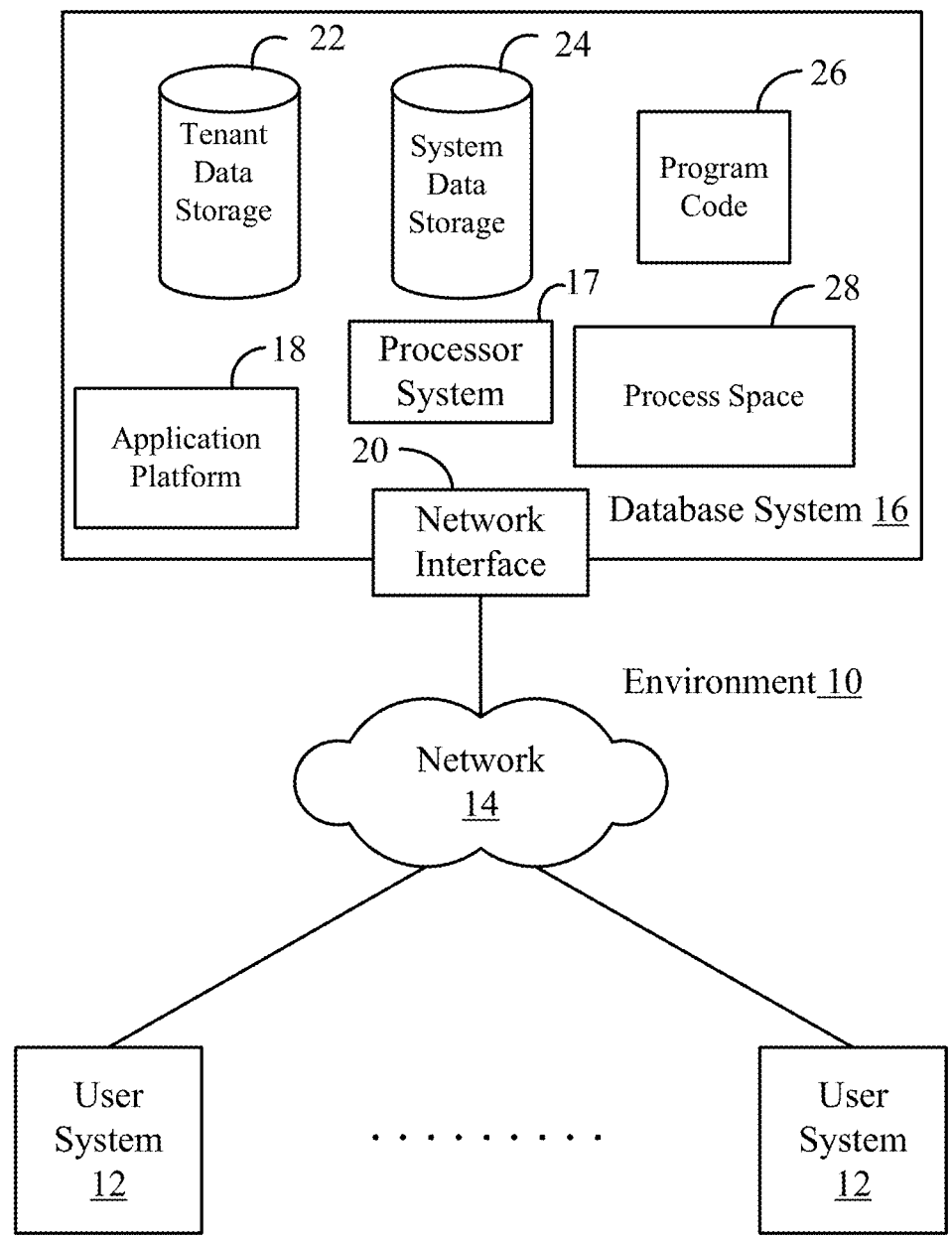
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
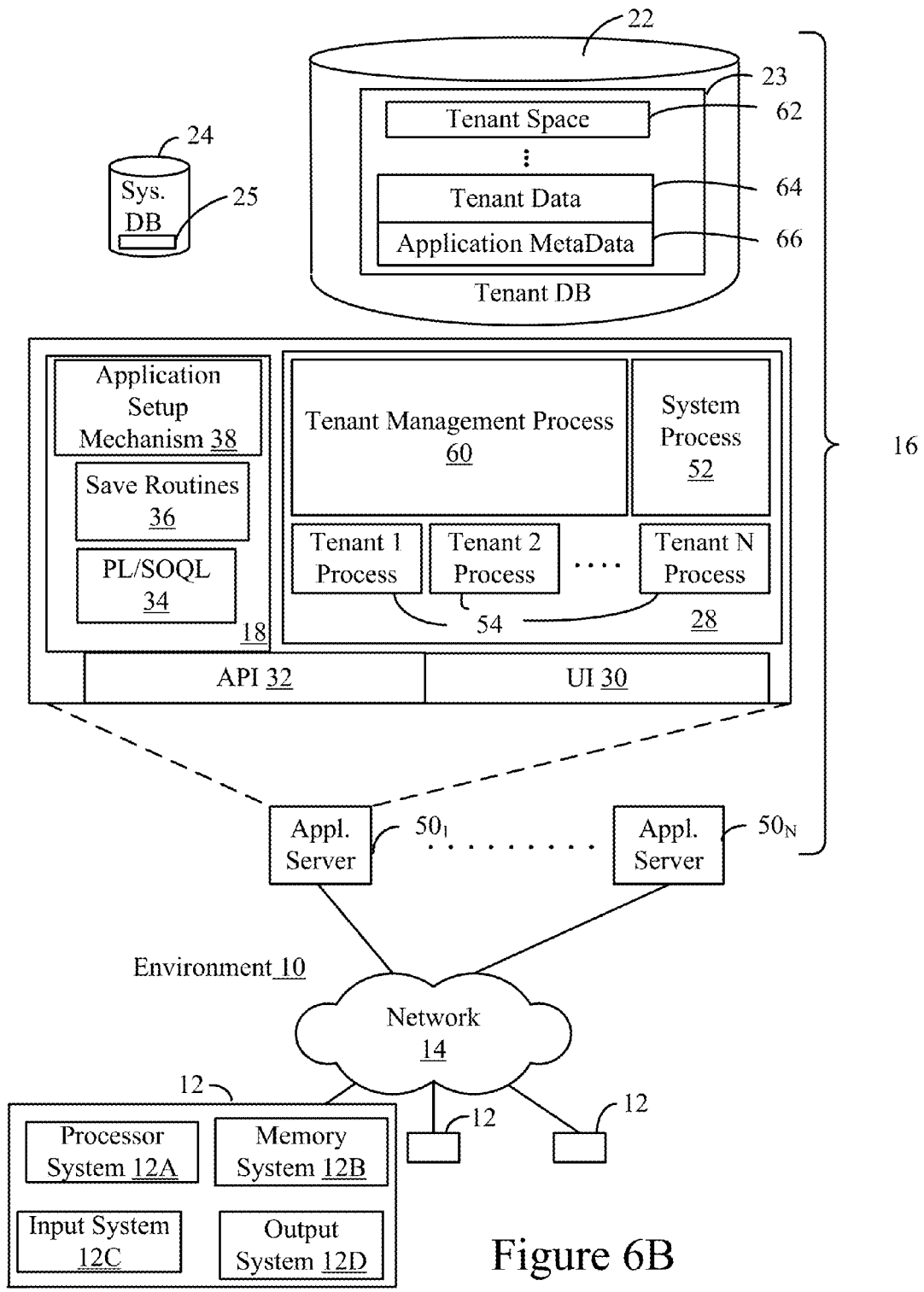
FIG. 6B shows a block diagram of an example of some implementations of elements of FIG. 6A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
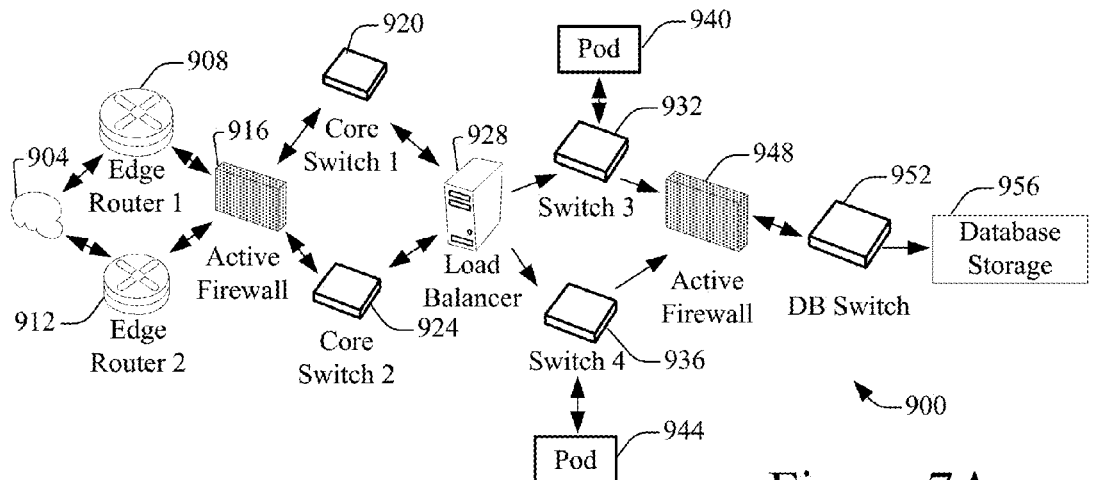
FIG. 7A shows a system diagram of an example of architectural components of an on-demand database service environment 900, in accordance with some implementations.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 7B:
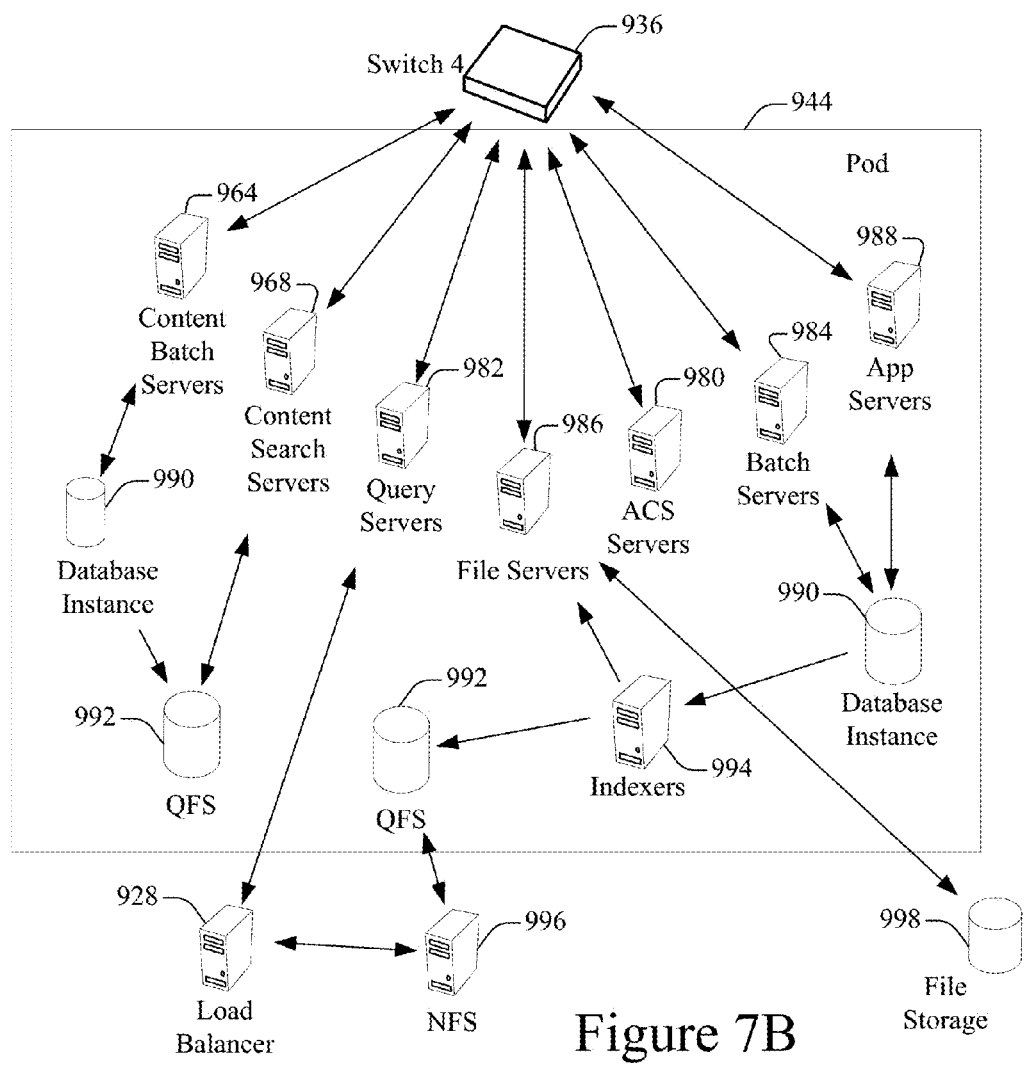
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988.

Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-5. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for reversing object manipulations in association with a walkthrough for an application or online service, the system comprising:
   a database storing data objects; and
   one or more servers in communication with the database, the one or more servers comprising one or more processors operable to cause:
      recording, in the database, a first state of one or more resources associated with a walkthrough for an application or online service, the walkthrough being an interactive demonstration of the application or online service, the walkthrough having a plurality of stages, each stage being a presentation demonstrating a corresponding feature of the application or online service;
      displaying, on a device of a user, a first one of the plurality of stages of the walkthrough;
      manipulating, responsive to receiving first input from the user to perform an interaction command with one or more demonstration objects associated with the first stage of the walkthrough, the one or more demonstration objects, the object manipulation changing the one or more resources from the first state to a second state, the input capable of being received via a data network from a computing device, the object manipulation corresponding to completion of the first stage and initiation of a second one of the plurality of stages of the walkthrough;
      recording, in the database, the second state;
      displaying, on the device of the user, the second stage of the walkthrough the second stage being chronologically ordered after the first stage;
      determining, based on the first state and the second state, one or more actions to reverse the object manipulation to return the one or more resources to the first state, the determining of the one or more actions comprising applying a set of rules, the set of rules comprising a mapping of designated commands to designated reverse commands, the designated commands being Hyper Text Transfer Protocol (HTTP) verbs comprising one or more of: POST, DELETE, or PUT, the designated reverse command for POST being DELETE, the designated reverse command for DELETE being POST, and the designated reverse command for PUT being PUT; and
      reverting, responsive to receiving second input from the user, from the second stage of the walkthrough to the first stage of the walkthrough by:
         performing the determined actions, and
         displaying, on the device of the user, the first stage of the walkthrough.

2. The system of claim 1, the one or more processors further operable to cause:
   determining one or more further actions to return the one or more resources to an initial state, the initial state being a state occupied by the one or more resources prior to an initiation of the walkthrough.

3. The system of claim 1, the one or more processors further operable to cause:
   generating or modifying, based on either or both of the first state or the second state, a walkthrough log.

4. The system of claim 1, the one or more processors further operable to cause:
   generating a preview of the walkthrough, the preview configured to be accessed via the data network; and
   providing, to the computing device, data capable of being processed by a processor of the computing device to display a presentation of the preview, the presentation of the preview capable of being interacted with by a user of the computing device to modify the walkthrough.

5. The system of claim 1 wherein changing the one or more resources from the first state to the second state comprises generating, modifying, or supplementing a record associated with a profile of an online social networking system.

6. The system of claim 1, wherein changing the one or more resources from the first state to the second state comprises generating, modifying, or supplementing a CRM (Customer Relationship Management) record stored in a database.

7. The system of claim 6, wherein the CRM record is: an account, a task, a lead, a contact, a contract, or an opportunity.

8. A method for reversing object manipulations in association with a walkthrough for an application or online service, the method comprising:
   recording, in a database of a database system, a first state of one or more resources associated with a walkthrough for an application or online service, the walkthrough being an interactive demonstration of the application or online service, the walkthrough having a plurality of stages, each stage being a presentation demonstrating a corresponding feature of the application or online service;
   causing display of, on a device of a user, a first one of the plurality of stages of the walkthrough;
   receiving first input, at one or more servers of the database system, to perform an interaction command with one or more demonstration objects associated with the first stage of the walkthrough, the input received over a data network from a computing device, the object manipulation corresponding to completion of the first stage and initiation of a second one of the plurality of stages of the walkthrough;
   causing, responsive to receiving the input, the one or more demonstration objects to be manipulated, the object manipulation changing the one or more resources from the first state to a second state;
   recording, in the database of the database system, the second state;
   causing display of, on the device of the user, the second stage of the walkthrough the second stage being chronologically ordered after the first stage;
   determining, based on the first state and the second state, one or more actions to reverse the object manipulation to return the one or more resources to the first state, the determining of the one or more actions comprising applying a set of rules, the set of rules comprising a mapping of designated commands to designated reverse commands, the designated commands being Hyper Text Transfer Protocol (HTTP) verbs comprising one or more of: POST, DELETE, or PUT, the designated reverse command for POST being DELETE, the designated reverse command for DELETE being POST, and the designated reverse command for PUT being PUT; and reverting, responsive to receiving second input from the user, from the second stage of the walkthrough to the first stage of the walkthrough by:
causing the determined actions to be performed, and
displaying, on the device of the user, the first stage of the walkthrough.

9. The method of claim 8, further comprising:
determining one or more further actions to return the one or more resources to an initial state, the initial state being a state occupied by the one or more resources prior to an initiation of the walkthrough.

10. The method of claim 8, further comprising:
generating or modifying, based on either or both of the first state or the second state, a walkthrough log.

11. A computer program product comprising computer-readable program code to be executed by one or more processors when retrieved from a non-transitory computer-readable medium, the program code including instructions configured to cause:
recording, in a database of a database system, a first state of one or more resources associated with a walkthrough for an application or online service, the walkthrough being an interactive demonstration of the application or online service, the walkthrough having a plurality of stages, each stage being a presentation demonstrating a corresponding feature of the application or online service;
displaying, on a device of a user, a first one of the plurality of stages of the walkthrough;
manipulating, responsive to receiving first input from the user to perform an interaction command with one or more demonstration objects associated with the first stage of the walkthrough, the one or more demonstration objects, the object manipulation changing the one or more resources from the first state to a second state, the input capable of being received via a data network from a computing device, the object manipulation corresponding to completion of the first stage and initiation of a second one of the plurality of stages of the walkthrough;
recording, in the database, the second state;
displaying, on the device of the user, the second stage of the walkthrough the second stage being chronologically ordered after the first stage;
determining, based on the first state and the second state, one or more actions to reverse the object manipulation to return the one or more resources to the first state, the determining of the one or more actions comprising applying a set of rules, the set of rules comprising a mapping of designated commands to designated reverse commands, the designated commands being Hyper Text Transfer Protocol (HTTP) verbs comprising one or more of: POST, DELETE, or PUT, the designated reverse command for POST being DELETE, the designated reverse command for DELETE being POST, and the designated reverse command for PUT being PUT; and
reverting, responsive to receiving second input from the user, from the second stage of the walkthrough to the first stage of the walkthrough by:
performing the determined actions, and
displaying, on the device of the user, the first stage of the walkthrough.

12. The computer program product of claim 11, the instructions further configured to cause:
determining one or more further actions to return the one or more resources to an initial state, the initial state being a state occupied by the one or more resources prior to an initiation of the walkthrough.

13. The computer program product of claim 11, the instructions further configured to cause:
generating or modifying, based on either or both of the first state or the second state, a walkthrough log.

* * * * *